(12) United States Patent
Fiore

(10) Patent No.: US 8,292,074 B2
(45) Date of Patent: Oct. 23, 2012

(54) STABILIZER FOR STABILIZING THE DISKS OF A HEAT PACK, IN PARTICULAR WHEN THE HEAT PACK IS PACKAGED IN A CONTAINER

(75) Inventor: Michel Fiore, Molsheim (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 12/623,148

(22) Filed: Nov. 20, 2009

(65) Prior Publication Data
US 2010/0122921 A1 May 20, 2010

(30) Foreign Application Priority Data

Nov. 20, 2008 (FR) ...................................... 08 06524

(51) Int. Cl.
*B65D 85/68* (2006.01)
(52) U.S. Cl. ........ 206/335; 206/493; 206/477; 206/483; 206/407; 206/308.1; 211/41.18
(58) Field of Classification Search .................. 206/318, 206/335, 493, 477, 483, 307.1, 308.1; 360/133; 134/135, 902, 25.4; 211/41.18
See application file for complete search history.

(56) References Cited

U.S. PATENT DOCUMENTS

| 2,613,983 | A | * | 10/1952 | Knudsen | 294/97 |
| 3,251,623 | A | * | 5/1966 | Fredholm | 294/97 |
| 3,736,777 | A | * | 6/1973 | Wirth | 70/63 |
| 3,904,031 | A | * | 9/1975 | Kessler | 206/727 |
| 4,253,571 | A | * | 3/1981 | Keohan | 206/308.3 |
| 4,790,430 | A | | 12/1988 | Thomas | |
| 6,036,007 | A | | 3/2000 | Alejandro et al. | |
| 2008/0000787 | A1 | | 1/2008 | Cress | |

FOREIGN PATENT DOCUMENTS
GB 1271197 A 4/1972
* cited by examiner

*Primary Examiner* — David T. Fidei
*Assistant Examiner* — Raven Collins
(74) *Attorney, Agent, or Firm* — Sughrue Mion, PLLC

(57) ABSTRACT

The invention relates to a stabilizer suitable for stabilizing disks of a heat pack, wherein the stabilizer includes at least two elongate parallel pushers of height compatible with the height of the heat pack, each movable in a direction perpendicular to the pushers, the pushers being associated with an irreversible driver system enabling the pushers to be moved apart or towards each other, the pushers extending in service so as to face an inside diameter of the disks.

11 Claims, 6 Drawing Sheets

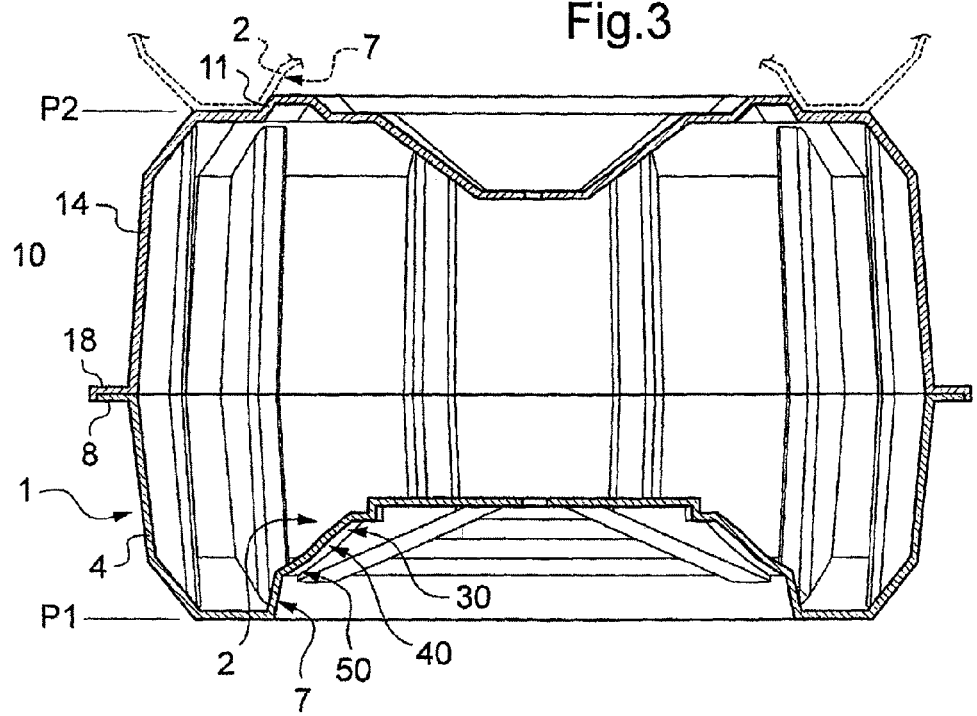
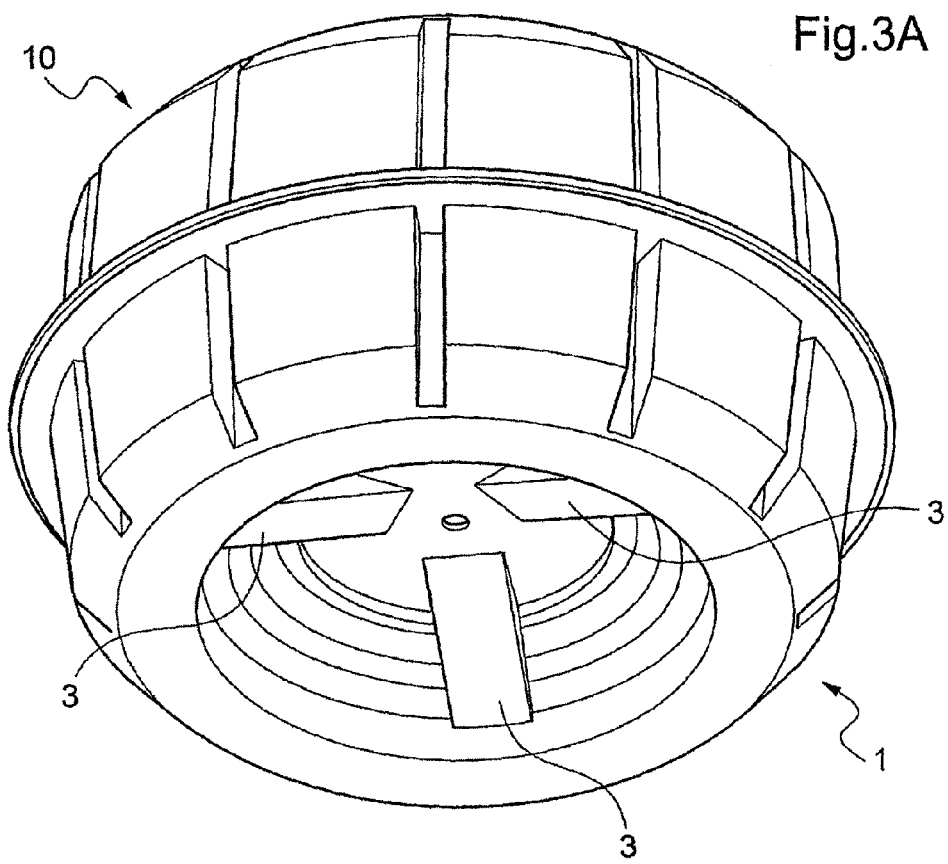

US 8,292,074 B2

STABILIZER FOR STABILIZING THE DISKS OF A HEAT PACK, IN PARTICULAR WHEN THE HEAT PACK IS PACKAGED IN A CONTAINER

The invention relates to a stabilizer for stabilizing a stack of brake disks, in particular aircraft brake disks, and suitable for being transported in a container.

TECHNOLOGICAL BACKGROUND

The invention applies more specially to a container receiving the brake disks stacked one on another. The set of brake disks (made up in alternation of rotor disks and stator disks) is commonly referred to as a heat pack, and it is transported as a unit in a suitable container.

Heat packs are transported on several occasions. New heat packs leaving the factory where they are fabricated are delivered to user clients, particularly aircraft manufacturers if the aircraft is being assembled, or if the aircraft is already in service with a company, to that company's storage premises, which may naturally be situated anywhere in the world. Furthermore, the company seeking to replace a worn heat pack with a new heat pack puts the worn heat pack into one of the containers to send it back to the factory where it was fabricated so that the worn disks can be reconditioned in the Applicant's factory or in any other suitable place.

This has caused the Applicant to make use of several thousand containers. At present, the Applicant uses containers that are generally in the form of bodies of revolution, each comprising a base on which the disks are stacked, and a cover fitted onto the base and covering the entire assembly. The heat pack bears against the base and a central pull rod screwed into the base and terminated by a hoist ring enables the container to be handled once it is closed.

Nevertheless, in all of the containers in which disks are transported stacked on one another, there is a risk of the disks sliding over one another while the container is being transported. For heat packs having disks of an outside diameter close to the inside diameter of the container, the disks are naturally centered and stabilized by the side wall of the container. However, for heat packs having disks that are smaller, there is nothing for stabilizing the disks to prevent them from sliding relative to one another.

OBJECT OF THE INVENTION

The invention seeks to propose a stabilizer for stabilizing the disks of a heat pack, in particular to enable them to be transported in a container.

BRIEF DESCRIPTION OF THE INVENTION

The invention proposes a stabilizer adapted to stabilizing disks of a heat pack that are stacked on one another, the stabilizer comprising at least two elongate parallel pushers having a height that is compatible with the height of the heat pack, the pushers being movable in a direction that extends perpendicularly to the pushers, the pushers being associated with an irreversible driver system enabling them to be moved towards or away from each other, the pushers extending in service so as to face an inside diameter of the disks.

Thus, in order to stabilize the disks, it suffices to insert stabilizer inside the disks so that the pushers extend facing the inside diameter of the disks. The driver system is then actuated to move the pushers apart from each other until they come into contact with the inside diameter of the disks. The irreversibility of the driver system ensures that the pushers then remain spaced apart in this way. The pushers are then advantageously engaged in the notches of the stator disks, thereby preventing them not only from sliding, but also from turning. This stabilizes the disks.

The pushers are preferably two in number and associated with arms that are engaged in a hollow body defining a guide path for the arms. The guide path enables the pushers to move along a common direction.

BRIEF DESCRIPTION OF THE DRAWINGS

The invention can be better understood in the light of the following description of the figures of the accompanying drawings, in which:

FIG. 3 is a section view of the container that contains the bottom shell of FIG. 1 and the top shell of FIG. 2;

FIG. 3A is a perspective view of the FIG. 3 container;

DETAILED DESCRIPTION OF THE INVENTION

The container described herein is specially adapted to receiving three types of heat pack, namely a 20" heat pack, a 22" heat pack, and a 23" heat pack (the dimensions in inches relating to the outside diameter of the disks). Naturally, the invention is not limited to these examples that are given by way of illustration.

These heat packs are put into place in the container by presenting the rear stator (i.e. the stator disk that faces the force take-up plate at the end of the torsion tube of the brake that receives the heat pack) towards the bottom, such that this disk is referred to below as the bottom disk. Naturally, the invention is not limited to this configuration, and the invention applies equally to a configuration in which the heat pack is presented with the front stator towards the bottom.

Figure 1:
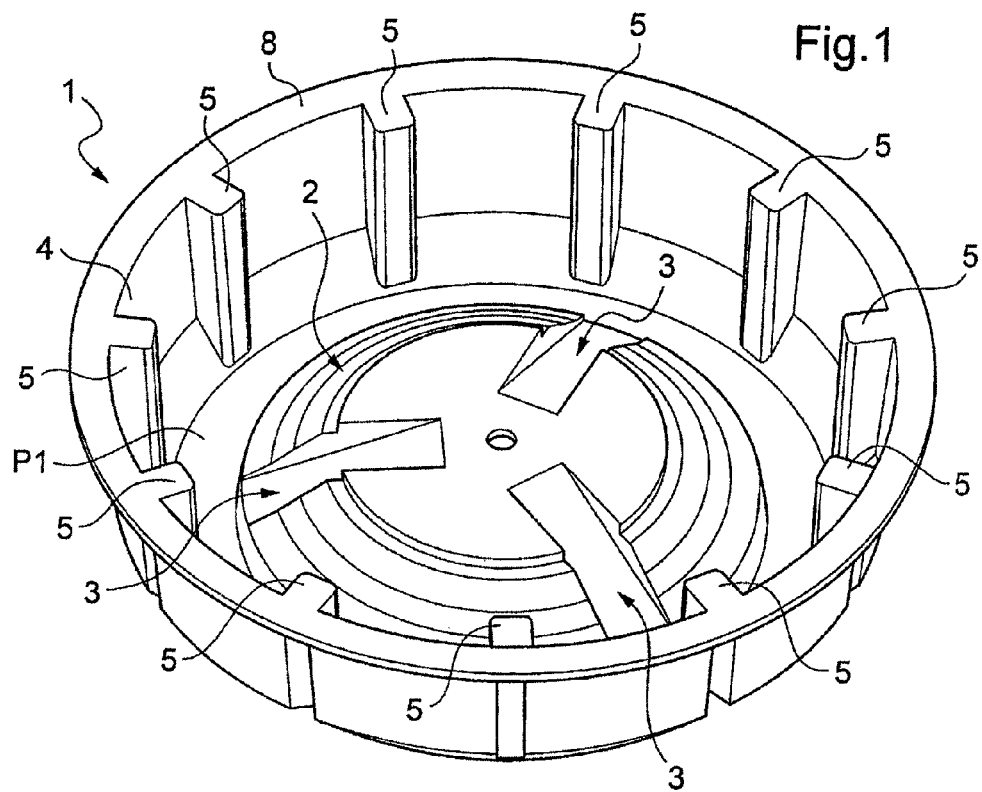
FIG. 1 is a perspective view of a bottom shell of a container in a particular embodiment of the invention.
Figure 2:
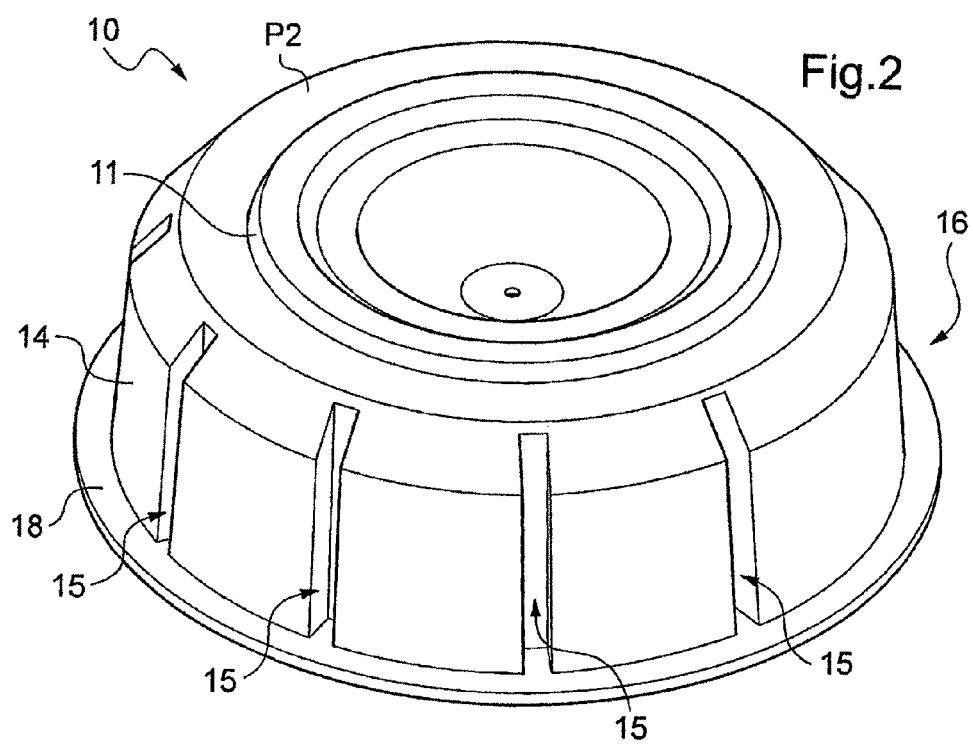
FIG. 2 is a perspective view of a top shell suitable for fitting to the bottom shell of FIG. 1.

With reference to FIGS. 1 to 3, the container comprises two shells generally in the form of bodies of revolution that together form the outer casing of the container, and comprising a bottom shell or base shell 1 and a top shell or cover 10. These shells are advantageously made of a plastics material by molding, injection-molding, rotor-molding, or any other known method.

The bottom shell 1 includes an annular plane portion P1 that defines a bearing plane via which the container rests on the ground or on any other surface receiving it, or indeed on another similar container, as described in detail below. A support 2 adapted to receive heat packs extends centrally from the annular plane portion P1. The support 2 is generally in the form of a body of revolution, except that in this example it has three notches 3 extending at 120° to one another. The notches 3 are integrally molded with the support 2 and they contribute to stiffening it. In addition, they define a passage under the seat (described in detail below) enabling three claws of a hoist member (as commonly used by the Applicant and also by many of its clients) to be inserted under the heat pack. This hoist member is inserted in the center of the heat pack, and its claws take up positions under the heat pack in the empty spaces defined by the notches 3, thereby enabling the heat pack that is received in the bottom shell 1 to be raised as a unit. The notches 3 can be seen more particularly from beneath in FIG. 3A.

The bottom shell 1 also has a side wall 4 that is stiffened by regularly distributed stiffeners 5 integrally molded with the side wall 4 and forming setbacks that project inwards into the base 1. These stiffeners thus naturally form centering means that co-operate with the outside surfaces of the larger-diameter disks to prevent them from sliding on one another. Finally, the bottom shell 1 has a peripheral collar 8 forming a bearing plane for receiving the top shell 10.

The top shell or cover 10 has an annular plane portion P2 that defines a bearing plane suitable for receiving another container superposed thereon. Frustoconical centering means 11 extend from the annular plane portion P2 and co-operate with a frustoconical inner wall 7 (visible in FIG. 3) constituted by the inner bottom wall of the support 2 of the bottom shell 1 of a superposed container (drawn in dashed lines in FIG. 3). Like the bottom shell 1, the top shell 10 has a side wall 14 presenting stiffeners 15 that can be seen in FIG. 2 solely in the form of setbacks. Unlike the bottom shell 1, these stiffeners 15 are not regularly distributed. A zone 16 of the side wall 14, visible on the right in FIG. 2, has no stiffeners and thus presents a smooth surface suitable for receiving a label for forming a writing zone suitable for identifying the content of the container without it being necessary to open it. The top shell 10 finally includes a collar 18 adapted to co-operate with the collar 8 of the bottom shell 1 for positioning and centering the top shell 10 on the bottom shell 1.

According to the invention, the support 2 has three seats given respective references 30, 40, and 50 for respectively receiving heat packs having diameters of 20", 22", and 23". Each of the seats is adapted to co-operate with an annular surface portion of the bottom disk of the corresponding heat pack. In this example, the bottom disk is made up by the rear stator of the heat pack, which is provided with studs, where appropriate, as can be seen in FIG. 4.

In this example, the bottom disks of all three heat packs in question have their inside diameters chamfered, however the slope of each chamfer is different. Each of the seats thus has a slope that is adapted to receive each of the heat packs so that the bottom disk bears against the seat via an annular bearing surface, and not via a single edge.

Figure 4:
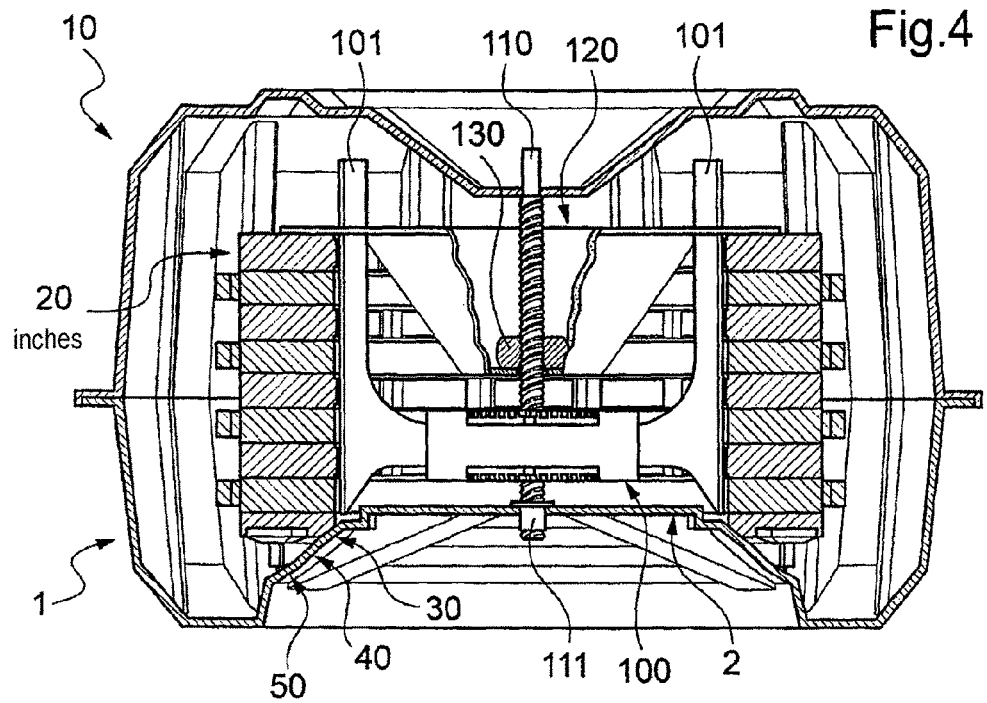
FIG. 4 is a section view of the FIG. 3 container in which a 20 inch (") heat pack is packaged.
Figure 5:
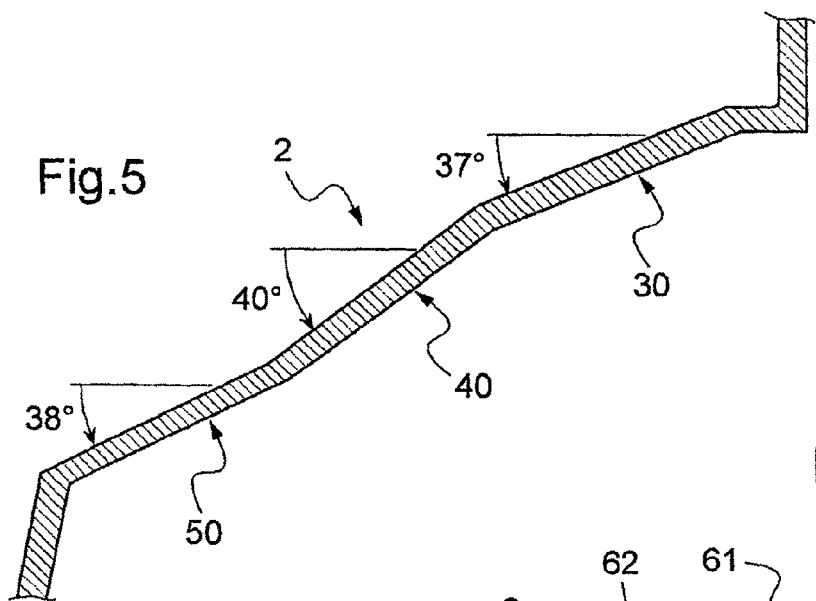
FIG. 5 is a fragmentary section of the support fitted to the bottom shell of the container.
Figure 6:
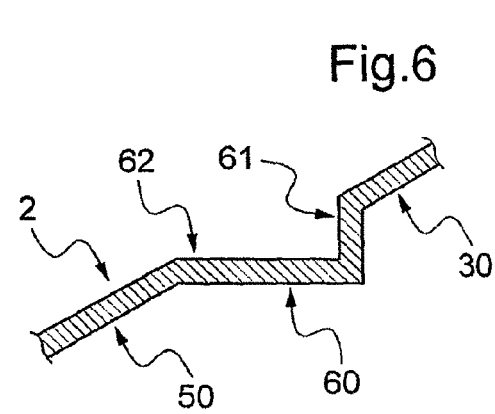
FIG. 6 is a fragmentary section of a variant embodiment of the support.

FIG. 4 shows how the 20" heat pack co-operates with its seat 30. FIG. 5 shows the various seats 30, 40, and 50 with their different slopes, all adapted to the inlet chamfer of the corresponding heat pack. The values of the slopes given in FIG. 5 are naturally given purely by way of indication. FIG. 6 shows a support adapted to receive 20", 22", and 23" heat packs, respectively. The 20" and 23" heat packs are identical to those described above, but the 22" heat pack has an inlet that is not chamfered. The seat 40 is thus replaced by the seat 60 shown in this figure. Such a seat advantageously includes a circularly cylindrical surface 61 that centers the bottom disk, and a plane bearing surface 63 that co-operates with the outer face of the bottom disk. Thus, even with this type of bottom disk, the support of the invention co-operates with the bottom disk not via a single edge, but via a bearing surface.

Figure 7:
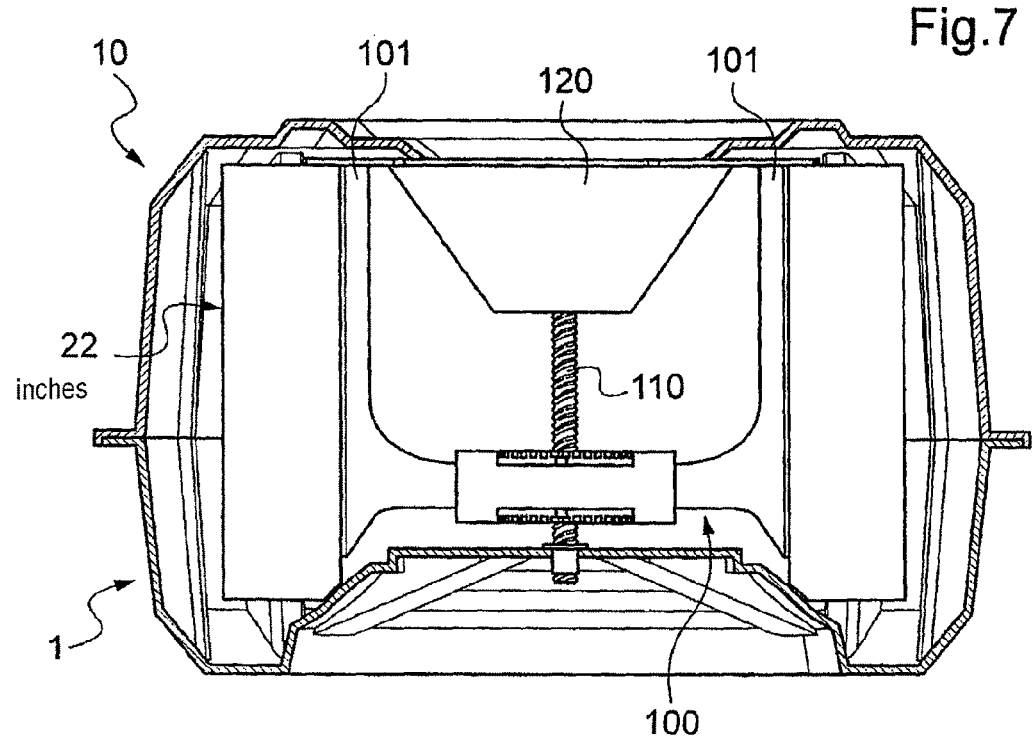
FIG. 7 is a section view of the FIG. 3 container in which a 22" heat pack is shown in silhouette.
Figure 8:
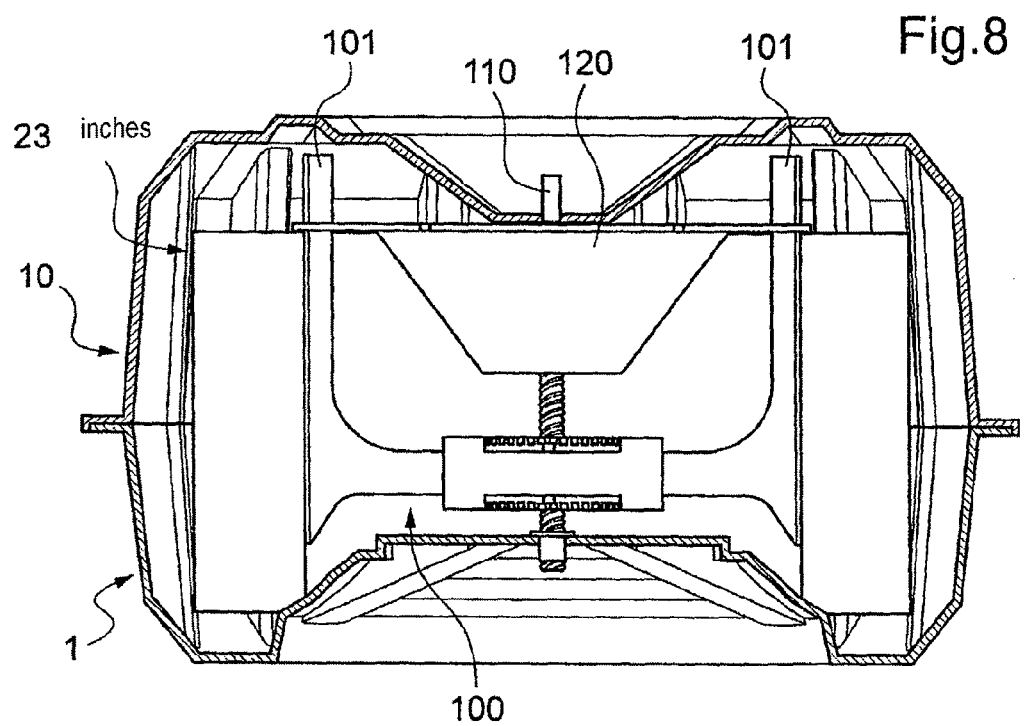
FIG. 8 is a section view analogous to FIG. 7, but with a 23" heat pack.

By way of illustration, FIGS. 7 and 8 show the closed container respectively receiving a 22" heat pack and a 23" heat pack, with only the outer silhouettes thereof being shown in the figures. It can be seen that these heat packs bear, via the inlet chamfers of their bottom disks, respectively against the seat 40 and against the seat 50.

As shown in FIG. 4, it should be observed that the bottom disks are often fitted with studs that project from the outside surface of the disk. It is appropriate to stagger the seats so that, for the heat packs having studs facing one of the other seats, the studs find sufficient empty space to avoid coming into contact with the facing seat. In this respect, and where appropriate, it is advantageous to provide a step between pairs of successive seats.

Figure 9:
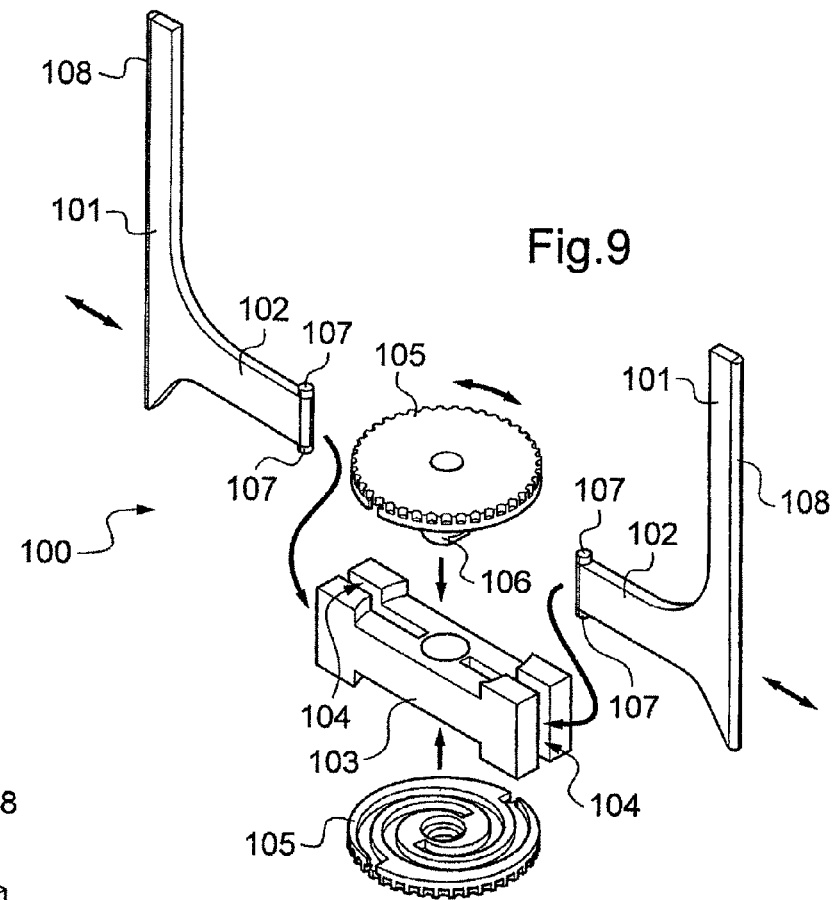
FIG. 9 is an exploded perspective view of a stabilizer for use in co-operation with the container of FIG. 3.
Figure 10:
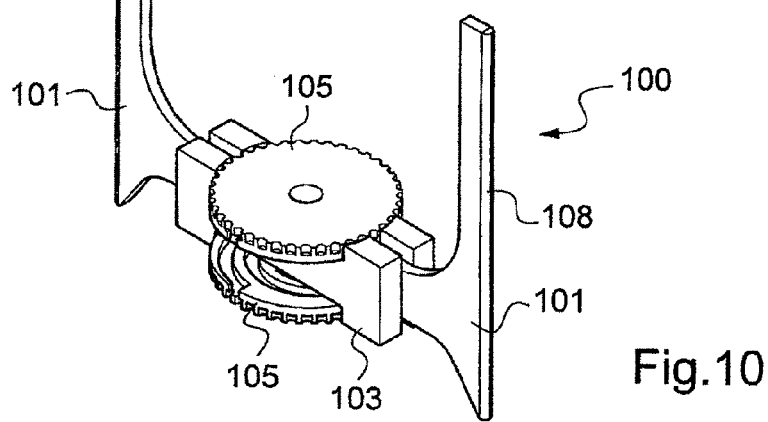
FIG. 10 is a perspective view of the FIG. 9 stabilizer.

According to the invention, the container is used together with a stabilizer 100, shown in exploded view in FIG. 9 and in assembled view in FIG. 10. The stabilizer 100 serves to hold the disks of the heat pack so that they do not slide relative to one another while they are being transported in the container. The stabilizer 100 comprises two elongate pushers 101 extending parallel to each other and associated with arms 102 that are engaged in grooves 104 of a body 103 that defines a guide path defining a common travel direction for the pushers 101. The body 103 also receives two knobs 105, one having a hub 106 that passes through the body 103 to form a pivot for the assembly formed by the two knobs. The facing faces of the knobs 105 carry spiral grooves and they receive fingers 107 carried at the ends of the arms 102, in such a manner that turning the knobs 105 causes the pushers 101 to move apart or towards each other in diametrically opposite directions, as represented symbolically by bold arrows. The knobs 105 also contribute to guiding the arms 102 in the grooves 104 by the inside faces of the knobs 105 co-operating with the facing faces of the arms 102. Thus, the pushers 101 are guided in a direction that is perpendicular to the pushers themselves. The connection between the knobs 105 and the pushers 101 is irreversible, such that it is not possible to move the pushers 101 apart or towards each other unless the knobs are turned deliberately. The set of parts making up the stabilizer 100 is advantageously molded or injection-molded out of plastics material. The outside faces of the pushers 101 that come into contact with the disks are advantageously covered in a coating 108 of elastomer or of any other springy material so as to damp impacts. It is naturally important for the pushers to be of a height that is compatible with the height of the heat pack, so that all of the disks are stabilized.

FIGS. 4, 7, and 8 show the stabilizer 100 put into place inside the heat pack after it has itself been placed in the bottom shell 1. For this purpose, and prior to putting the stabilizer 100 into place, it is appropriate to insert a pull rod 110 having its bottom end screwed into an insert 111 at the center of the bottom of the bottom shell 1. The stabilizer 100 is then presented and engaged on the pull rod 110 so that the pushers 101 extend facing the disks, inside them. Thereafter, the knobs 105 are turned until the pushers of the stabilizer bear against the disks. The disks are thus prevented from moving relative to one another. Any risk of the disks sliding relative to each other is thus eliminated.

Figure 11:
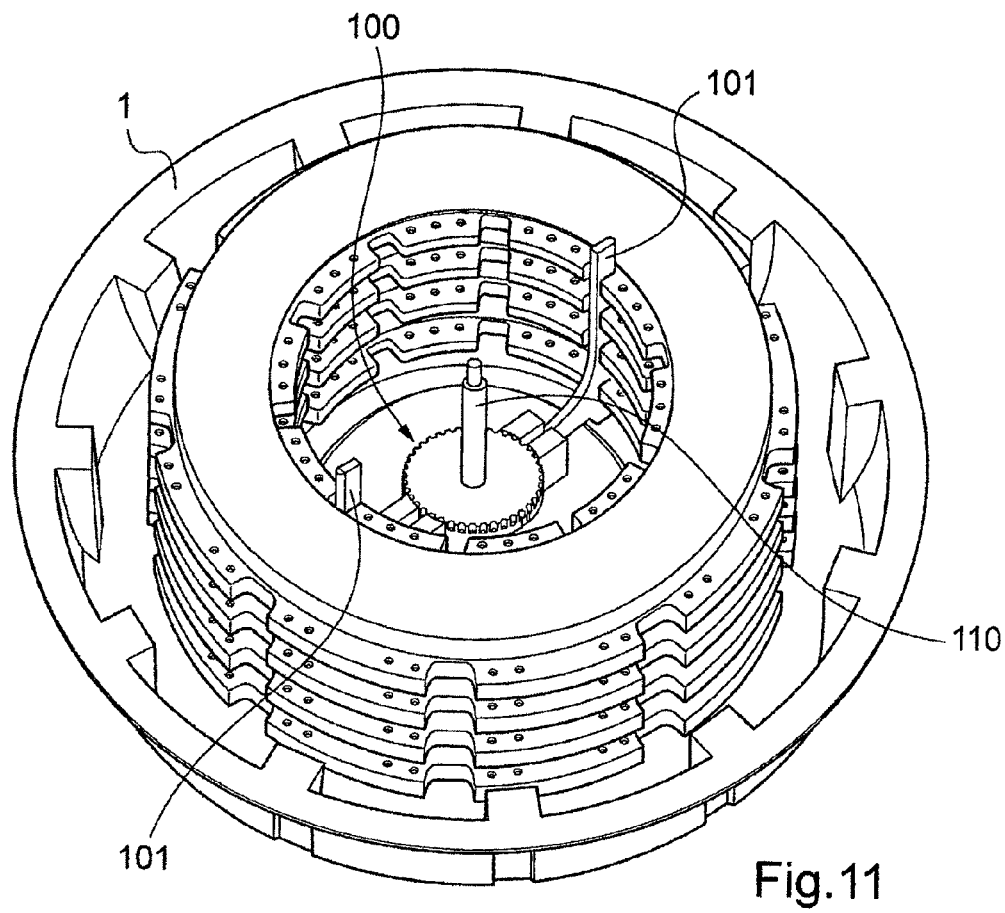
FIG. 11 is a perspective view of a container receiving a heat pack, in which the stabilizer has been put into place.

In FIG. 11, it can be seen how the stabilizer is put into place in the container. It is engaged on the pull rod 110, and then the top knob 105 is turned so that the arms 101 are received in the notches of the stator disks.

Figure 12:
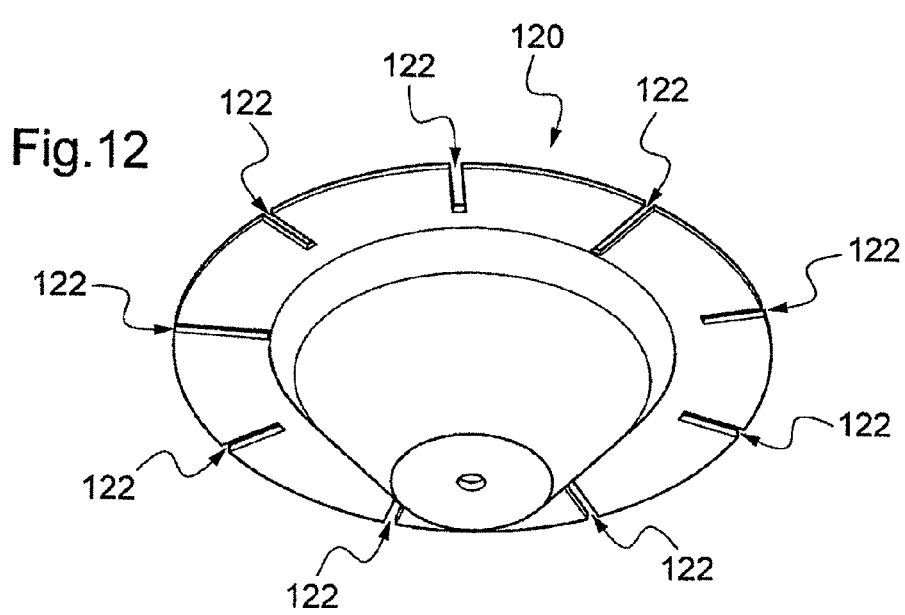
FIG. 12 is a perspective view of a dished plate that is fitted over the heat pack after the stabilizer has been put into place.

To improve the packaging of the heat pack in the container, it is appropriate to position a dished plate 120 as shown in FIG. 12 above the heat pack. The plate 120 comprises an annulus 121 having radial grooves 122 formed therein to allow the ends of the arms 101 to pass through the plate 120. The annulus 121 is placed on the outside face of the top disk of the heat pack. The center of the plate 120 includes a central orifice for passing the pull rod, and it is conical in shape so that, as shown in FIG. 4, it is possible to install a spring nut 130 on the pull rod 110 and thus hold the disks making up the heat pack firmly against one another.

It is then appropriate to put the top shell 10 into place on the bottom shell 1 so as to close the container. In this position, the pull rod 110 passes through the top shell 10, thereby making it possible to fasten a hoist ring on the projecting end of the pull rod 110 thus enabling the container to be hoisted, and also serving to hold the top shell 10 against the bottom shell 1.

The invention is not limited to the above description, but on the contrary covers any variant coming within the scope of the claims. In particular, it is to be understood that the above-mentioned heat packs are mentioned purely by way of illustration. The container of the invention can be adapted to other heat packs, and it may be designed to transport other types of heat pack. In addition, although the container described above is adapted to receive three types of heat pack, the same container could receive other heat packs of the same diameter providing they are compatible with the seats.

Furthermore, although the support in the above example is made integrally with the bottom shell, provision could be made for a removable support to be fitted on the bottom shell. Finally, although the container shown has a bottom shell and a top shell forming respectively a base and a cover of the container, the invention is more generally applicable to any other form of container, e.g. a container comprising a base, a cover, and a belt as described in document U.S. Pat. No. 4,790,430. Under all circumstances, the support is carried by the base, regardless of whether said base is fitted with a side wall so as to constitute a bottom shell as shown herein.

Furthermore, although it is stated that the stabilizer of the invention is used in conjunction with a container, it is clear that the stabilizer could be used in other circumstances. For example it could be used to stabilize heat packs stored in a warehouse, not in a container. It could also serve to center stacks of disks in order to prepare a heat pack.

Finally, although the stabilizer shown herein has only two pushers, it would naturally be possible to provide some greater number of pushers, e.g. three or four. The body would then have a star shape defining a plurality of grooves converging towards a central axis coinciding with the axis of rotation of the pusher-driver member, which could be constituted by a knob with spiral grooves, as described, or by any other known driver device, such as for example a rack system.

What is claimed is:

1. A stabilizer suitable for stabilizing stacked brake disks of an aircraft heat pack, said heat pack having a height, wherein the stabilizer comprises:
   at least two elongate parallel pushers of height at least equal to the height of the heat pack and defining an elongate direction, each of said at least two elongate parallel pushers being movable in a direction perpendicular to the elongate direction of said pusher, each of said at least two elongate parallel pushers being associated with an irreversible driver system enabling said pusher to be moved apart or towards another of said at least two elongate parallel pushers, the at least two elongate parallel pushers extending in service so as to have a surface thereof in said elongate direction and along said heat pack height face an inside diameter surface of the disks and be brought into engagement with said inside diameter surface of all of the disks in said heat pack in order to stabilize said disks, wherein the inside diameter surface comprises a surface of a notch in said disks.

2. A stabilizer according to claim 1, wherein the pushers are two in number and are associated with arms engaged in a hollow body defining a guide path for the arms, enabling the pushers to be moved along a common direction.

3. A stabilizer according to claim 2, wherein the arms are terminated by fingers that penetrate into spiral grooves formed on the facing faces of two knobs that are secured to each other and that extend on either side of the hollow body.

4. A stabilizer according to claim 1, wherein the pushers have outer edges facing the disks that are covered in a springy covering.

5. A stabilizer for stabilizing stacked brake disks of an aircraft heat pack, said heat pack having a height, an outside diameter from a central axis, and a center hole defining an inner heat pack surface at an inside diameter from said center axis, the stabilizer comprising:
   a plurality of pushers, each pusher in said plurality of pushers having a first portion at height in an elongate direction at least equal to the height of the heat pack and a second portion extending orthogonal to said first portion and having a length less than said inside diameter, each pusher in said plurality of pushers, including the first portion and second portion, being movable in a movement direction extending radially from said center axis and perpendicular to the elongate direction of said pusher, and
   an irreversible driver system coupled to each pusher in said plurality of pushers and enabling each pusher to be moved apart or towards each other in said movement direction, each pusher in said plurality of pushers being extendable in said movement direction so as to contact said inner heat pack surface in order to stabilize said disks,
   wherein the inner heat pack surface comprises a surface of a notch in said disks.

6. The stabilizer according to claim 5, wherein said stabilizer further comprises a body having two guide path portions extending radially from said center axis along a common diameter, and said pushers are two in number, each second portion of said pushers comprising an arm engaged with a respective one of said guide path portions and enabling the pushers to be moved along said common diameter.

7. The stabilizer according to claim 6, wherein the arms are terminated by fingers that penetrate into spiral grooves formed on the facing faces of two knobs that are secured to each other and that extend on at least one side of the body.

8. The stabilizer according to claim 5, wherein the pushers have outer edges facing the disks that are covered in a springy covering.

9. A stabilizer for stabilizing stacked brake disks of an aircraft heat pack, said heat pack having a height, an outside diameter from a central axis, and a center hole defining an inner heat pack surface at an inside diameter from said center axis, the stabilizer comprising:
   a plurality of pushers, each pusher in said plurality of pushers having a first portion at height in an elongate direction at least equal to the height of the heat pack and a second portion extending orthogonal to said first portion and having a length less than said internal inside diameter, each pusher in said plurality of pushers, including the first portion and second portion, being movable in a movement direction extending radially from said center axis and perpendicular to the elongate direction of said pusher, and an irreversible driver system coupled to each pusher in said plurality of pushers and enabling each pusher to be moved apart or towards each other in said movement direction, each pusher in said plurality of pushers being extendable in said movement direction so as to contact said inner heat pack surface in order to stabilize said disks, wherein the first portion and second portion are integrally formed as a single structure.

10. The stabilizer according to claim 9 wherein the single structure is substantially L-shaped.

11. The stabilizer according to claim 9 wherein the entire single structure moves in said movement direction.

* * * * *